United States Patent [19]

Ito et al.

[11] Patent Number: 5,128,911

[45] Date of Patent: Jul. 7, 1992

[54] OPTICAL DISC REPRODUCING APPARATUS HAVING AN AUTOMATIC GAIN CONTROL CIRCUIT

[75] Inventors: Motoshi Ito, Toyonaka; Shunji Ohara, Higashiosaka; Kenzo Ishibashi, Moriguchi, all of Japan

[73] Assignee: Matsushita Electric Industrial Co., Ltd., Kadoma, Japan

[21] Appl. No.: 611,799

[22] Filed: Nov. 13, 1990

[30] Foreign Application Priority Data

Nov. 20, 1989 [JP] Japan ................................. 1-301696

[51] Int. Cl.$^5$ ................................................ G11B 7/00
[52] U.S. Cl. ........................................ 369/32; 369/33; 369/44.28; 369/44.29; 369/44.35; 369/44.36
[58] Field of Search ............... 369/44.28, 44.29, 44.35, 369/44.36, 32, 30, 33, 54, 44.25, 44.26, 116, 44.34, 44.39, 44.32; 360/78.04; 358/342, 907

[56] References Cited

U.S. PATENT DOCUMENTS

| | | | |
|---|---|---|---|
| 4,340,950 | 7/1982 | Kosaka | 369/44.37 |
| 4,544,872 | 10/1985 | Hirano et al. | 369/44.29 |
| 4,580,255 | 4/1986 | Inoue et al. | 369/44.29 |
| 4,750,161 | 6/1988 | Takeuchi et al. | 369/44.11 |
| 5,007,038 | 4/1991 | Nakane et al. | 369/44.11 |

*Primary Examiner*—Roy N. Envall, Jr.
*Assistant Examiner*—Hung Dang
*Attorney, Agent, or Firm*—Cushman, Darby & Cushman

[57] ABSTRACT

An apppparatus for preventing an undesirable increase in the gain of an automatic gain control circuit (AGC circuit) when an optical pickup of an optical disc reproducing apparatus performs a track jump operation. A detected signal of an optical pickup is applied to an AGC circuit for equalizing the level of the detected signal. The output of the AGC circuit is detected by an envelope detector and compared with a reference level by a comparator. The output of the comparator is applied to the AGC circuit as a gate signal for holding the gain of the AGC circuit to a predetermined value during tracing of a nonrecorded part of a track. Additionally, a jump signal, which is output from a jump signaling device during a track jump operation of the optical pickup, is applied to the AGC circuit to hold the gain to a predetermined value during a track jump operation.

2 Claims, 6 Drawing Sheets

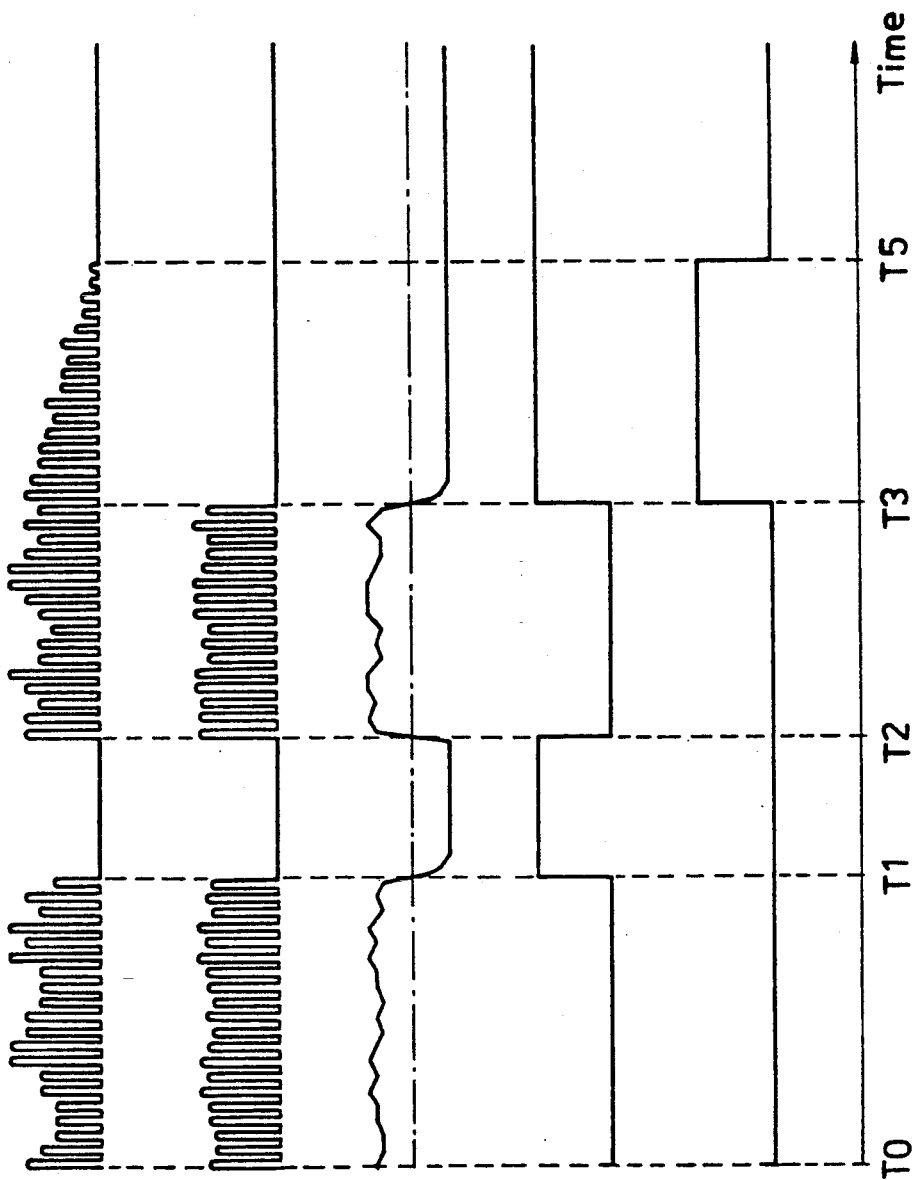

OPTICAL DISC REPRODUCING APPARATUS HAVING AN AUTOMATIC GAIN CONTROL CIRCUIT

FIELD OF THE INVENTION AND RELATED ART STATEMENT

1Field of the Invention

The present invention relates generally to an optical-disc apparatus, and more particularly to an optical disc reproducing apparatus having an automatic gain control circuit which is controlled by a jump signal when crossing from one track to another.

2. Description of the Related Art

FIG. 1 is the circuit of an optical disc reproducing apparatus in the prior art. Referring to FIG. 1, optical signal detecting means comprises an optical pickup 1A having a PIN photodiode 101 for detecting a reflected light from an optical disc and a current-voltage convertor 1 for converting the detected current signal of the PIN photodiode 101 into a voltage signal. The output of the current-voltage convertor 1 is applied to an amplifier 2. The output of the amplifier 2 is applied to an AGC circuit 3 (automatic gain control circuit) for keeping an amplitude of the detected optical signal to a predetermined level.

In the optical disc, information is recorded by a series of pits 5 on a track T1 as shown in FIG. 2(a), and the track comprises a part having a series of the pits (hereinafter is referred to as recorded part) and a part having no pit (hereinafter is referred to as nonrecorded part). When the recorded part of the track T1 is traced by the optical pickup 1A, the detected signal of the waveform shown in FIG. 2(b), for example, is output, but when the nonrecorded part is traced thereby, no detected signal is output. In general, the amplitude of the detected signal of address pits is different from that of data pits. Additionally, the amplitude of the detected signal is varied by the material of the optical disc itself. Therefore, the amplitude of the detected signal needs to be equalized by the AGC circuit 3. The AGC circuit 3 is made to have a sufficiently rapid response speed for following the variation of the detected signal of the optical pickup 1A. The output of the AGC circuit 3 is applied to a further amplifier (not shown) for reproducing the information of the optical disc via a terminal 7. The output of the AGC circuit 3 is also applied to an input signal detecting circuit 4 shown in FIG. 1.

The input signal detecting circuit 4 is comprised of an envelope detector 4A having a diode 401, a resistor 402 and a capacitor 403, and a comparator 404. The output of the AGC circuit 3 is input to the envelope detector 4A. The detected signal of the envelope detector 4A is applied to the invert input (−) of the comparator 404, and a reference voltage RV is applied to the noninvert input (+) thereof. The output of the envelope detector 4A is compared with the reference voltage RV in the comparator 404. When the output of the envelope detector 4A is lower than the reference voltage RV, a gate signal 8 is output from the comparator 404. The output of the AGC circuit 3 is normally lower than the reference voltage RV when the optical pickup 1A traces the nonrecorded part of a track. Thus the gate signal 8 represents tracing of the nonrecorded part of the optical disc. The gate signal 8 is applied to the AGC circuit 3, and thereby the gain of the AGC circuit 3 is held to a predetermined value which is comparatively lower. The response speed of gain control of the AGC circuit 3 is less than the variation speed of a detected signal of the optical pickup 1A when tracing the boundary of the recorded part and nonrecorded part on the same track. Consequently, when the optical pickup 1A traces from the recorded part to the nonrecorded part on the same track, an increase in the gain of the AGC circuit 3 cannot overtake a decrease in the level of the detected signal. The output of the AGC circuit 3 decreases in compliance with the input signal thereof which corresponds to the detected signal of the optical pickup 1A. Thus, the invert input level of the comparator 404 is lowered, and the gate signal is output from the comparator 404. The gain of the AGC circuit 3 is held to the predetermined value by the gate signal.

In general, the optical disc has a spiral track or a plurality of concentric tracks. In reproduction of the recorded signal of the above-mentioned tracks, the optical pickup 1A in which the PIN photodiode 101 is mounted is shifted in the radial direction of the optical disc. And when the optical pickup 1A is shifted from a track to other track for reproducing the data of other addresses, the optical pickup 1A crosses from one track to another track.

Referring to FIG. 2(a) two-dotted lines A1 represents a recorded track T1 having the series of the pits 5, and two-dotted lines A2 represents a nonrecorded track T2 neighboring to the track T1. The path 6 of the optical pickup 1A in the shift operation is represented by a solid line. Note the solid line is not perpendicular from one track to the other because the optical disc is rotated.

FIG. 2(b) is a waveform of the detected signal of the optical pickup 1A in the shift operation along the path 6. Since the diameter of the detected area of the optical pickup 1A is larger than the diameter of the pit 5, the amplitude of the detected signal gradually decreases in accordance with the shift of the optical pickup 1A from track T1 to track T2 as shown in FIG. 2(b).

The detected signal is amplified by the amplifier 2 and is applied to the AGC circuit 3. Since the response speed of the AGC circuit 3 is sufficiently rapid with respect to a varying speed of the detected signal in the shift operation, the AGC circuit 3 varies the gain in compliance with the variation of the detected signal. Consequently, when the optical pickup 1A moves to nonrecorded track T2, the gain of the AGC circuit 3 increases, and a noise component of the detected signal of the optical pickup 1A is amplified and output from the AGC circuit 3. The noise component detected by the envelope detector 4A is applied to the comparator 404. Since the gain of the AGC circuit 3 is generally made considerably higher, the level of the noise becomes higher than the reference voltage RV, and thus the gate signal is not output for limiting the increase of the gain of the AGC circuit 3. Such amplification of the noise component is not desirable for reproduction of the optical disc.

OBJECT AND SUMMARY OF THE INVENTION

An object of the present invention is to provide an optical disc reproducing apparatus having an automatic gain control circuit for preventing undesirable increase of the gain thereof when an optical pickup of the optical disc reproducing apparatus cross from one track to another track on an optical disc.

The optical disc reproducing apparatus in accordance with the present invention comprises:

optical signal detecting means for detecting light reflected by an optical disc, automatic gain control means for controlling a gain to equalize an amplitude of the detected signal of the optical signal detecting means and for keeping the gain to a predetermined value when a gate signal is applied thereto.

an envelope detector for detecting the output of the automatic gain control circuit, a comparator for comparing the output level of the envelope detector with a predetermined reference level and outputting the gate signal when the output level of the automatic gain control means is lower than the reference level, and jump signal applying means for applying a jump signal to the automatic gain control means to hold a predetermined gain of the automatic gain control means during a track jump operation of the optical signal detecting means.

According to the present invention, when the optical pickup travels from a recorded track to a non-recorded track, an abnormal increase in the gain of the automatic gain control means by reduction of a detected signal level of the optical pickup is prevented and can be maintained to an adequate gain.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 6(a), 6(b), 6(c), 6(d) and 6(e) are waveforms in operation of the second embodiment.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
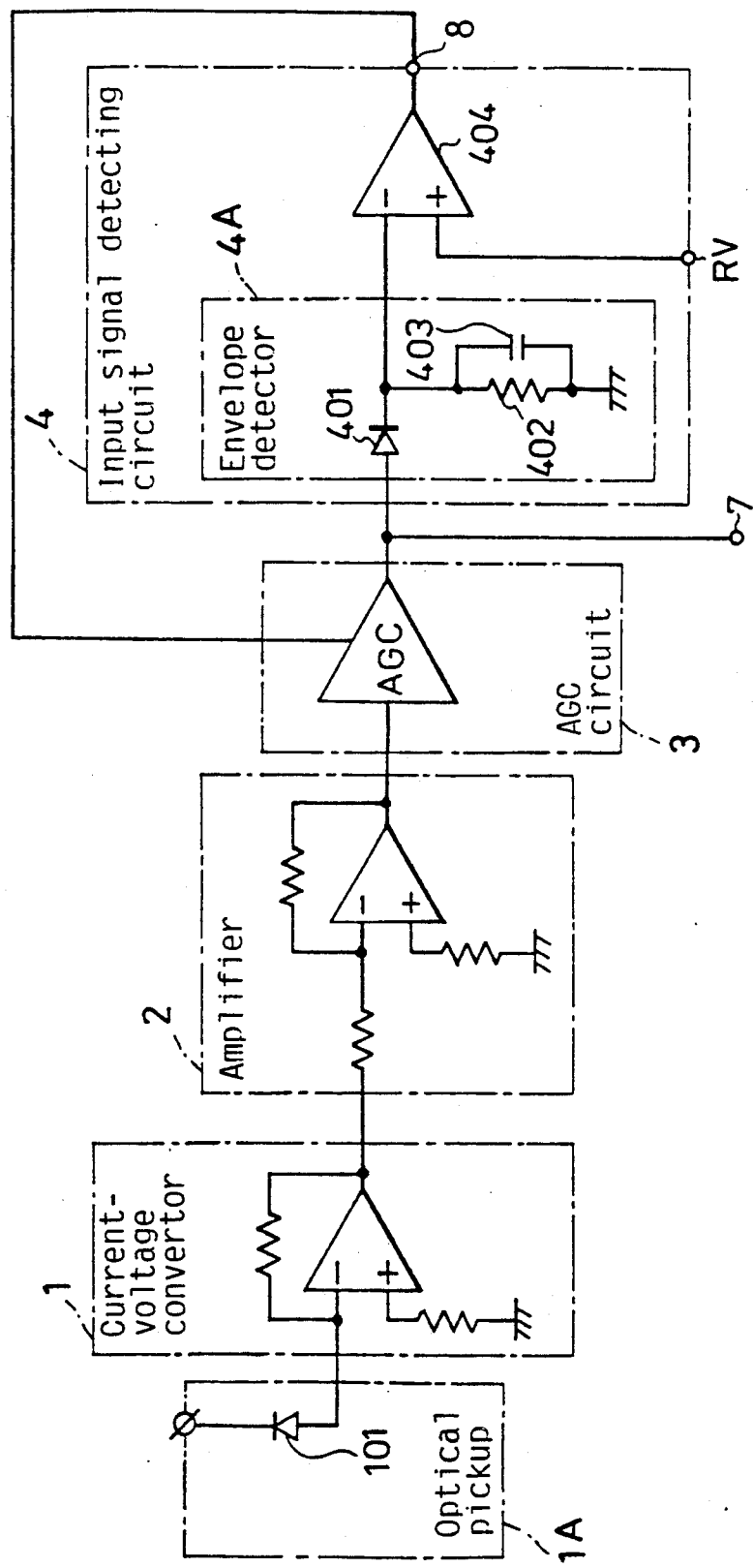
FIG. 1 is the circuit of the relevant parts of the optical disc reproducing apparatus in the prior art.
Figures 2A, 2B:
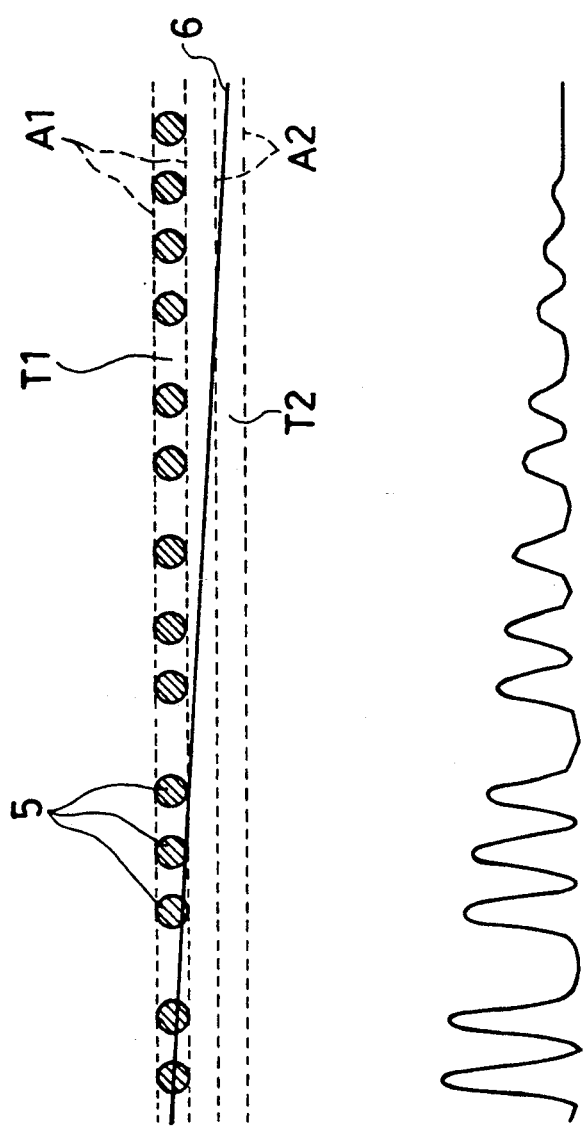
FIG. 2(a) is an enlarged plan view of the tracks of an optical disc.
FIG. 2(b) is a waveform of the detected signal of the optical pickup.
Figure 3:
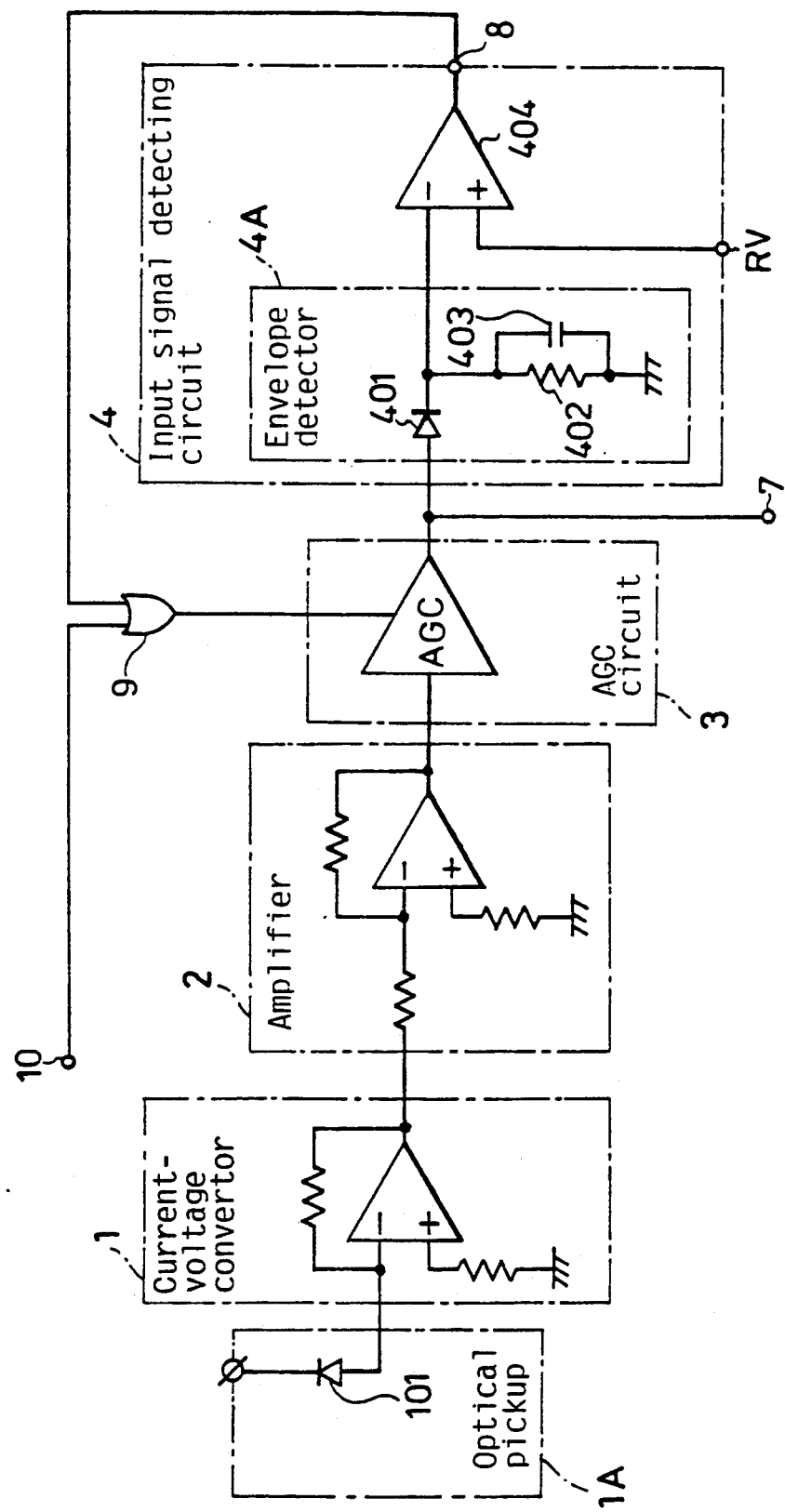
FIG. 3 is a circuit of the relevant parts of an optical disc reproducing apparatus of a first embodiment in accordance with the present invention.

FIG. 3 is a circuit of a first embodiment of the optical disc reproducing apparatus in accordance with the present invention. Referring to FIG. 3, an optical signal detecting means for detecting a light reflected by the surface of an optical disc comprises an optical pickup 1A and a current-voltage convertor 1. The optical pickup 1A comprises a PIN photodiode 101 for detecting the light reflected by the surface of the optical disc and a driving mechanism for shifting the optical pickup 101; these are familiar to one skilled in the art (not shown). The output current of the optical pickup 1A is converted to voltage signal by the current-voltage convertor 1. The output of the current-voltage convertor 1 is applied to an amplifier 2, and is amplified thereby. The output of the amplifier 2 is applied to an AGC circuit 3 the gain of which varies inversely proportional to the level of the input signal. The output of the AGC circuit 3 is input to an input signal detecting circuit 4.

The input signal detecting circuit 4 comprises an envelope detector 4A composed of a diode 401, a resistor 402 and a capacitor 403 and an comparator 404. The output of the envelope detector 4A is applied to the invert input (−) of the comparator 404, and a reference voltage RV is applied to the noninvert input (+) thereof. The amplified signal of the AGC circuit 3 is output to a terminal 7 to be supplied to other circuits. The output of the comparator 404 (hereinafter referred to as gate signal) is applied to an input of an OR gate 9. A jump signal for instructing track jump of the optical pickup 1A is applied to the other input 10 of the OR gate 9. The output of the OR gate 9 (hereinafter referred to as gain hold signal) is applied to the AGC circuit 3.

Operation of the first embodiment is elucidated hereafter. The detected current signal of the optical pickup 1A is converted to a voltage signal by the current-voltage convertor 1 and is amplified by the amplifier 2, and is applied to the AGC circuit 3. The AGC circuit 3 has responsibility to equalize the level of the detected signal which varies due to inequality of the surface of the optical disc. The output of the AGC circuit 3 is detected by the envelope detector 4A and is applied to the invert input (−) of the comparator 404. In the comparator 404, when the invert input level is higher than the reference voltage RV, which is applied to the noninvert input (+), there is no output at the output terminal 8 of the input signal detecting circuit 4.

When the optical pickup 1A traces on the nonrecorded part of a track, the detected signal is not output, and thus no input signal is applied to the AGC circuit 3. Consequently, the output level of the AGC circuit 3 is in a low level, and the invert input level of the comparator 404 is also in the low level. When the invert input level is lower than the reference voltage RV, the comparator 404 outputs the gate signal for representing tracing of the nonrecorded part of the track at the output terminal 8. The gate signal is applied to the AGC circuit 3 through the OR gate 9. The AGC circuit 3 is controlled by the gate signal to hold the gain thereof to a predetermined value.

FIGS. 4(a) through 4(f) are waveforms of signals in operation of the first embodiment, and the abscissa is graduated by a time which corresponds to a position on a track of the optical disc.

Figure 4:
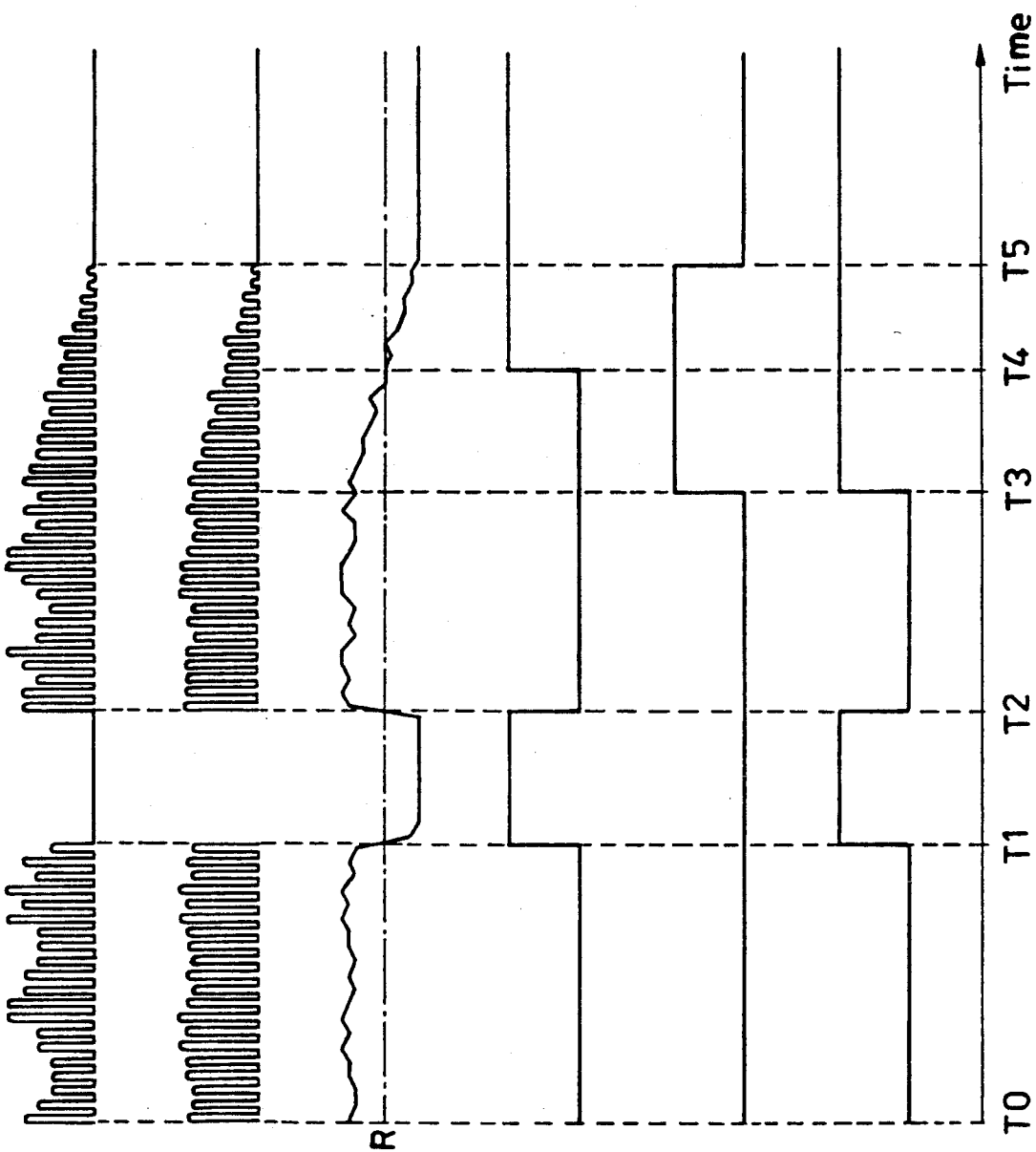
FIGS. 4(a), 4(b), 4(c), 4(d), 4(e) and 4(f) are waveforms in operation of the first embodiment.

FIG. 4 (a) is a waveform of the input signal of the AGC circuit 3. From a time T0 to a time T1, a recorded part of a track is detected by the optical pickup 1A, and the detected signal shown by FIG. 4(a) is applied to the AGC circuit 3. At the time T1, a nonrecorded part of the track is detected by the optical pickup 1A, and the input of the AGC circuit 3 disappears. At a time T2, a recorded part of the track is detected again. The output of the AGC circuit 3 is shown in FIG. 4(b). Referring to FIG. 4(b), variation of the amplitude in the input signal is considerably equalized. The output of the AGC circuit 3 is detected by the envelope detector 4A. The detected signal shown in FIG. 4(c) is applied to the invert input of the comparator 404. The invert input level of the comparator 404 decreases at the time T1 as shown in FIG. 4(c) and becomes lower than the reference voltage RV. Consequently, the comparator 404 outputs the gate signal for representing tracing of non-recorded part as shown in FIG. 4(d). The gate signal is applied to the OR gate 9 as shown in FIG. 3, and the gain hold signal shown in FIG. 4(f) is applied to the AGC circuit 3 between the time T1 and the time T2, and thereby the gain thereof is maintained to the value which is identical with the gain before the gain hold signal was applied between the time T1 and the time T2.

At a time T3, as shown in FIG. 4(e), a jump signal for instructing jump of track is applied to the optical pickup 1A (not shown). The optical pickup 1A is moved to a radial direction of the optical disc and is shifted to a neighboring track in compliance with the jump signal. Since the optical pickup 1A goes away from the track, the amplitude of the detected signal of the optical pickup 1A (input of AGC circuit 3) gradually decreases as shown in FIG. 4(a). On the other hand, the jump signal is also applied to the OR gate 9 at the time T3, and the gain hold signal is applied to the AGC circuit 3. Thus the gain of the AGC circuit 3 is held to the predetermined value. Since the level of the invert input of the comparator 404 becomes lower than the reference voltage RV at a time T4 by reduction of the output level of the AGC circuit 3, the gate signal is output from the comparator 404 and is applied to the OR gate 9. Thus the gain hold signal is applied to the AGC circuit 3. The jump signal disappears at a time T5 as shown in FIG. 4(e), and the track jump operation is completed. Since the track on which the optical pickup 1A is shifted is a nonrecorded track, the output level of the AGC circuit 3 is substantially zero, and the gate signal is continuously output.

The response of the AGC circuit 3 speed of gain control is made less than the variation speed of the detected signal, and thus the control of gain can not follow the signal level variations when crossing over the boundary of the recorded part and the nonrecorded parts of the track. However, when the optical pickup jumps from the track having the recorded part to a track having no recorded part, a detected signal of the recorded part gradually decreases with the movement of the optical pickup 1A in the radial direction of the optical disc. The gain of the AGC circuit 3 increases in inversely proportional to the increase of the detected signal. In the first embodiment, the increase of the gain is prevented by the jump signal.

Figure 5:
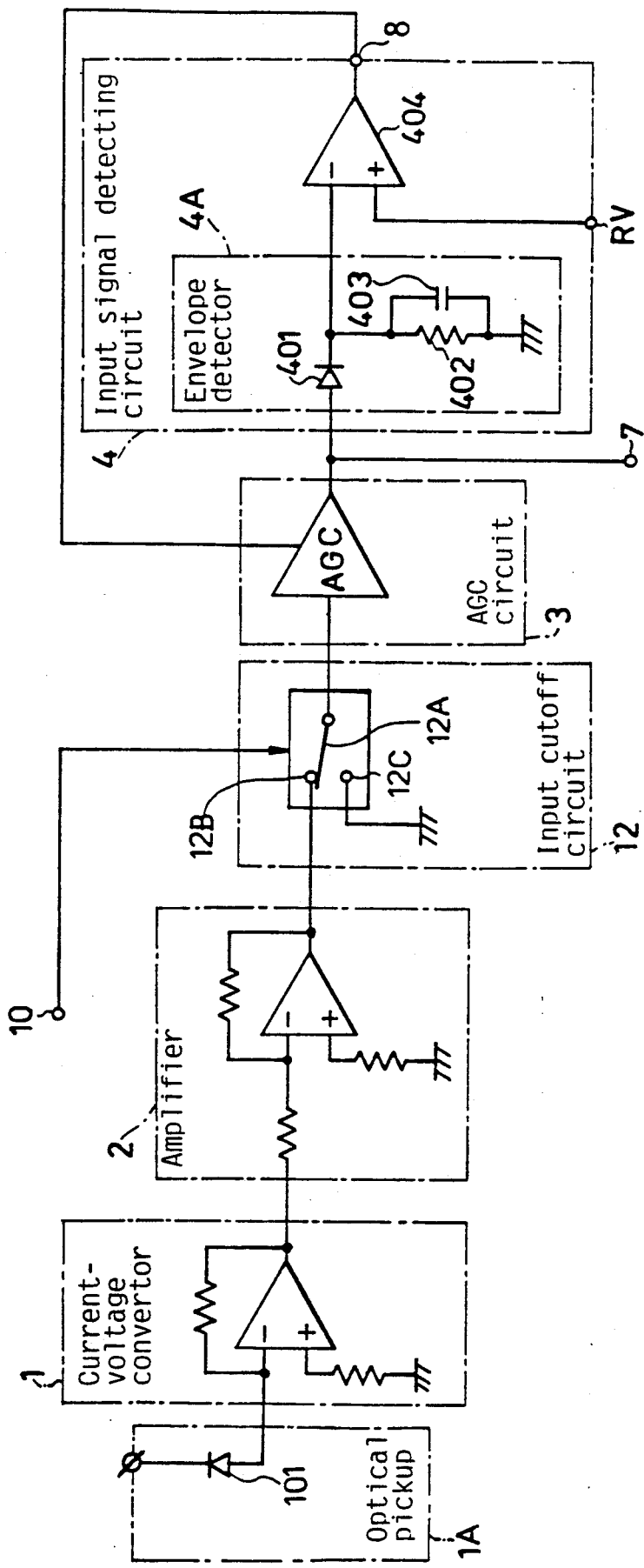
FIG. 5 is a circuit of the relevant parts of an optical disc reproducing apparatus of a second embodiment in accordance with the present invention.

FIG. 5 is a circuit of a second embodiment in accordance with the present invention. In the second embodiment, an input cutoff circuit 12 is provided between the amplifier 2 and the AGC circuit 3. The input cutoff circuit 12 comprises a moving contact 12A and transfer contacts 12B and 12C. The moving contact 12A is activated by the jump signal applied to input 10. The output of the comparator 404 is directly input to the AGC circuit 3. The remaining components functioning in the same manner as in the arrangement of FIG. 3 are designated by the like numerals as used with corresponding parts shown in FIG. 3.

In the second embodiment, the output of the amplifier 2 is communicated to the input of the AGC circuit 3 through the contact 12B and the moving contact 12A during tracing of a track of the optical disc. In the track jump operation of the optical pickup 1A, the jump signal is applied to the input cutoff circuit 12, and the moving contact 12A is contacted to the contact 12C, and the input of the AGC circuit 3 is grounded. Consequently, the invert input of the comparator 404 becomes zero, and the gate signal is output from the comparator 404. Thus, the gain of the AGC circuit 3 is determined by the gate signal.

Though the input cutoff circuit 12 is represented by a symbol of mechanical switch in FIG. 5 it is also possible to use a CMOS analogue switch (for example, Model MM54HC4066 or MM74HC4066 in the INDUSTRIAL LINEAR IC MANUAL ('89 Part 1) of the National Semiconductor Corp.).

The above-mentioned operation is shown in FIGS. 6(a) through 6(e). The optical pickup 1A traces the recorded part of a track between the times T0 and T1 and between the times T2 and T3. A nonrecorded part of the track is traced between the times T1 and T2. Operation of the optical disc reproducing apparatus between the times T0 and T3 is identical with that of the first embodiment. Track jump operation is started at time T3 and the input cutoff circuit 12 is activated by the jump signal as shown in FIG. 6(e). Consequently, the output of the AGC circuit 3 disappears as shown in FIG. 6(b) because the input of the AGC circuit 3 is grounded by the input cutoff circuit 12. Thus the comparator 404 outputs the gate signal as shown in FIG. 6(d), and the gain of the AGC circuit 3 is held to a predetermined value. In the second embodiment, the input cutoff circuit 12 can be inserted between the optical pickup and the current-voltage convertor 1, between the current-voltage convertor 1 and amplifier 2, between the AGC circuit 3 and the input signal detecting circuit 4 or between the envelope detector 4A and comparator 404.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

What is claimed is:

1. An optical disc reproducing apparatus comprising:
   optical signal detecting means for detecting light reflected by an optical disc,
   automatic gain control means having a controllable gain for equalizing an amplitude of a detected signal of said optical signal detecting means and for keeping said controllable gain at a first and second predetermined gain in response to a gate signal and a jump signal, respectively,
   an envelope detector for detecting an output of said automatic gain control circuit,
   a comparator for comparing an output level of said envelope detector with a predetermined reference level and outputting said gate signal when said output level is lower than said reference level, and
   jump signal applying means for applying a jump signal to said automatic gain control means during a track jump operation of said optical signal detecting means.

2. An optical disc reproducing apparatus comprising:
   optical signal detecting means for detecting light reflected by an optical disc,
   automatic gain control means having a controllable gain for equalizing an amplitude of a detected signal of said optical signal detecting means and for keeping said controllable gain at a first and second predetermined gain in response to a gate signal,
   an envelope detector for detecting an output of said automatic gain control circuit, a comparator for comparing an output level of said envelope detecting means with a predetermined reference level and outputting said gate signal when said output level is lower than said reference level, and switch means for interrupting communication of said detected signal to said comparator during a track jump operation, said switch means disposed at a junction between one of an output of said optical signal detecting means and an input of said automatic gain control means, between an output of said automatic gain control means and an input of said envelope detector, and between an output of said envelope detector and an input of said comparator.

* * * * *